US010638325B2

(12) United States Patent
Garg et al.

(10) Patent No.: US 10,638,325 B2
(45) Date of Patent: *Apr. 28, 2020

(54) SON-CONTROLLED DFS

(71) Applicant: Parallel Wireless, Inc., Nashua, NH (US)

(72) Inventors: Sumit Garg, Hudson, NH (US); Steven Beaudette, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,320

(22) Filed: May 15, 2018

(65) Prior Publication Data

US 2018/0295520 A1    Oct. 11, 2018

Related U.S. Application Data

(63) Continuation of application No. 15/219,267, filed on Jul. 25, 2016, now Pat. No. 9,973,935.

(60) Provisional application No. 62/196,537, filed on Jul. 24, 2015.

(51) Int. Cl.
| | |
|---|---|
| *H04W 16/10* | (2009.01) |
| *H04W 16/14* | (2009.01) |
| *H04W 84/12* | (2009.01) |
| *H04W 88/16* | (2009.01) |

(52) U.S. Cl.
CPC ............ *H04W 16/10* (2013.01); *H04W 16/14* (2013.01); *H04W 84/12* (2013.01); *H04W 88/16* (2013.01)

(58) Field of Classification Search
CPC ..... H04W 16/10; H04W 16/14; H04W 88/16; H04W 84/12
See application file for complete search history.

(56) References Cited

U.S. PATENT DOCUMENTS

| | | |
|---|---|---|
| 9,755,798 B2 | 9/2017 | Centonza et al. |
| 2011/0255486 A1 | 10/2011 | Luo et al. |
| 2011/0255520 A1* | 10/2011 | Chu ...................... H04W 40/26 370/336 |
| 2011/0319084 A1 | 12/2011 | Meshkati et al. |
| 2012/0021753 A1 | 1/2012 | Damnjanovic et al. |
| 2012/0250632 A1 | 10/2012 | Mo et al. |
| 2012/0307710 A1* | 12/2012 | Yoon .................. H04B 7/15507 370/315 |

(Continued)

*Primary Examiner* — Brian D Nguyen
(74) *Attorney, Agent, or Firm* — Michael Y. Saji; David W. Rouille

(57) ABSTRACT

A centrally controlled dynamic frequency selection (DFS) mechanism is defined that uses a historical analytical database to define DFS hop patterns, which allows for a better probability of picking a non-interfering channel but also meets the performance requirements of the mesh and satisfying the timing constraints of DFS. A method for performing dynamic frequency selection (DFS) is disclosed, comprising: receiving, at a gateway, measurement reports from a radio access node regarding observed utilization of a 5 GHz radio frequency band shared with a plurality of radio access nodes; determining, based on the received measurement reports, a frequency hop pattern at the gateway; and sending the frequency hop pattern from the gateway to each of the plurality of radio access nodes, thereby enabling compliance with DFS regulations using a centralized gateway.

19 Claims, 4 Drawing Sheets

(56) References Cited

U.S. PATENT DOCUMENTS

| | | | |
|---|---|---|---|
| 2012/0307869 A1* | 12/2012 | Charbit | H04B 1/715 375/132 |
| 2013/0114451 A1 | 5/2013 | Al-Dhahir et al. | |
| 2013/0142138 A1 | 6/2013 | Dinan | |
| 2013/0148620 A1 | 6/2013 | Nanri et al. | |
| 2014/0215491 A1* | 7/2014 | Addepalli | H04W 4/046 719/313 |
| 2015/0056931 A1 | 2/2015 | Yerramalli et al. | |
| 2015/0194999 A1* | 7/2015 | Lea | H01Q 21/24 455/562.1 |
| 2015/0296413 A1 | 10/2015 | Sadek et al. | |
| 2015/0296490 A1 | 10/2015 | Yi et al. | |
| 2016/0112145 A1* | 4/2016 | Rezk | G01S 7/021 455/67.13 |
| 2016/0119071 A1 | 4/2016 | Sagong et al. | |
| 2016/0173152 A1 | 6/2016 | Rahman et al. | |
| 2016/0286425 A1 | 9/2016 | Gormley et al. | |
| 2016/0345323 A1* | 11/2016 | Krishnamoorthy | H04W 48/02 |

* cited by examiner

SON-CONTROLLED DFS

CROSS-REFERENCE TO RELATED APPLICATIONS

This application is a continuation of, and claims the benefit of an earlier filing date under 35 U.S.C. § 120 based on, U.S. Pat. No. 9,973,935, filed Jul. 25, 2016, and entitled "SON-Controlled DFS," which itself claims priority under 35 U.S.C. § 119(e) to, and is a non-provisional application of, U.S. Provisional App. No. 62/196,537, entitled "DFS Management in an IBSS Network Using Centralized SON," filed Jul. 24, 2015, each of which is hereby incorporated by reference in its entirety for all purposes. This application also hereby incorporates by reference in their entirety U.S. application Ser. No. 14/034,915, and titled "Dynamic Multi-Access Wireless Network Virtualization," and filed Sep. 24, 2013; and U.S. application Ser. No. 14/024,717, and titled "Heterogeneous Self-Organizing Network for Access and Backhaul," and filed Sep. 12, 2013; and U.S. application Ser. No. 14/642,544, and titled "Federated X2 Gateway," and filed Mar. 9, 2015.

Additional documents which relate to this technical field include: ETSI TR 102 651, "Broadband Radio Access Networks (BRAN); 5 GHz high performance RLAN; Guide to the implementation of DFS"; IEEE 802.11-2012, "Wireless LAN Medium Access Control (MAC) and Physical Layer (PHY) Specifications," with specific reference to Section 10.9; EN 301 893, "DFS regulations in 5150-5725 MHz Band"; EN 302 502, "DFS regulations in 5.8 GHz Band"; FCC KDB 905462; all Section 15.401 UNIT/DFS Test Procedures related documents; and FCC 15.407, Part 15E, "FCC regulations dealing with the operation of Unlicensed National Information Infrastructure Devices," each of which is incorporated by reference herein in its entirety.

BACKGROUND

In radio communications, spectrum is a scarce resource. Often, there can be more than one non-interworking users for a particular channel or frequency. In general, in such a case one of those users is designated as the primary user and the other as the secondary user. The secondary user of a frequency would have additional constraints defined for its operation including regulations for power and constraints put on the spectral emission mask. The primary goal of all these restrictions is to allow the secondary users access to the spectrum as long as they do not interfere with the operation of the primary user.

The 5 GHz spectrum is typically put to three distinct primary uses: maritime communications radars; weather radars; and military communications. The interesting thing about these users is that even though they are the primary users of a large chunk of spectrum, they use it very sporadically and typically require very low bandwidths. So, in order to make best use of this underutilized spectrum, regulatory authorities in the European Union have developed a concept called dynamic frequency selection (DFS). The DFS regulations impose very strict timing and non-interference requirements on the secondary users of the spectrum, which also make the spectrum useful only in an unlicensed/lightly-licensed scenario. Over the years, the use of DFS has spread throughout the world. It has been one of the major drivers for adoption of Wi-Fi as DFS provides it with a huge spectrum which is lot less noisy than the 2.4 GHz ISM band.

Each regulatory regime has defined pulse patterns for radars, which a secondary user is expected to detect in real time and take corrective action so as to not interfere with them.

SUMMARY

In some embodiments, a centrally controlled DFS mechanism is defined that uses a historical analytical database to define DFS hop patterns, which allows for a better probability of picking a non-interfering channel but also meets the performance requirements of the mesh and satisfying the timing constraints of DFS. The difference from 802.11h is that the algorithm has been pushed out from the AP to the central entity, without requiring the AP to intelligently select a hop pattern.

In one embodiment, a method for performing dynamic frequency selection (DFS) is disclosed, comprising: receiving, at a gateway, measurement reports from a radio access node regarding observed utilization of a 5 GHz radio frequency band shared with a plurality of radio access nodes; determining, based on the received measurement reports, a frequency hop pattern at the gateway; and sending the frequency hop pattern from the gateway to each of the plurality of radio access nodes, thereby enabling compliance with DFS regulations using a centralized gateway.

The plurality of radio access nodes may be at least two access points each using 802.11 Wi-Fi in a 5 GHz frequency band, which may be in use for a mesh network connection. The plurality of radio access nodes may be connected in a 5 GHz Wi-Fi mesh network and may be configured to use the gateway to connect to a telecommunications operator core network. The frequency hop pattern may be a channel switching sequence. The method may further comprise retrieving the frequency hop pattern from a database at the gateway. The method may further comprise generating the frequency hop pattern based on historical DFS information stored at the gateway. The method may further comprise switching, at the plurality of radio access nodes, to a next frequency specified by the frequency hop pattern to avoid, or avoid causing, interference to communications radars, weather radars, or military communications. An individual radio access node may cause connected devices to move to the next frequency using a channel switch announcement in a beacon frame or channel switch announcement frame.

The method may further comprise sending, from an individual radio access node, the frequency hop pattern to a plurality of connected stations to enable the plurality of connected stations to perform a backoff recovery procedure. The method may further comprise detecting, at one of the plurality of radio access nodes, a radar or military signal in the 5 GHz radio frequency band. The method may further comprise configuring a selection method at the gateway from a remote management client or periodically updating the selection method at the gateway. The method may further comprise propagating the frequency hop pattern to each node in a mesh network. The method may further comprise providing a second frequency hop pattern to an additional radio access network. The method may further comprise selecting the frequency hop pattern based on received signal strength information (RSSI) or signal to noise ratio (SNR). The method may further comprise selecting the frequency hop pattern based on historical DFS event data, regulatory profile data, or indoor/outdoor frequency band configuration.

The frequency hop pattern may be a single frequency to pick at a next DFS event. The method may further comprise performing off-channel radar scanning. The method may further comprise selecting a backhaul radio frequency based on the frequency hop pattern. The method may further comprise using a global table to avoid multiple radios being switched to the same frequency. The method may further comprise advertising preferred frequencies at each radio access node in a mesh network, and caching the preferred frequencies at the gateway.

In another embodiment, a system for performing dynamic frequency selection (DFS) is disclosed, comprising a gateway configured to perform steps further comprising: receiving, at a gateway, measurement reports from a radio access node regarding observed utilization of a 5 GHz radio frequency band shared with a plurality of radio access nodes; determining, based on the received measurement reports, a frequency hop pattern at the gateway; and sending the frequency hop pattern from the gateway to each of the plurality of radio access nodes, thereby enabling compliance with DFS regulations using a centralized gateway.

DETAILED DESCRIPTION

Figure 1:
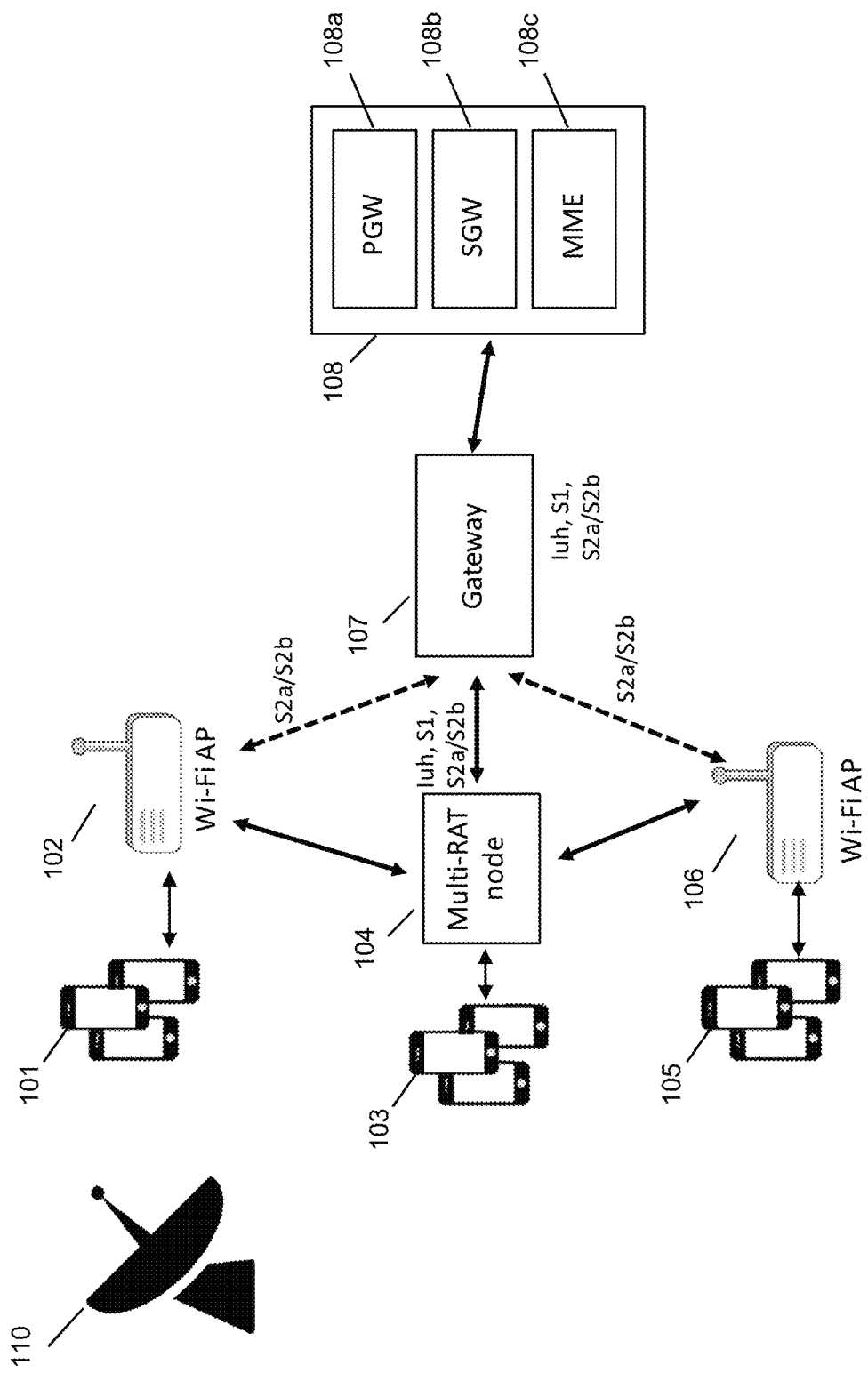
FIG. 1 depicts a network diagram of a wireless network, in accordance with some embodiments.

Dynamic frequency selection (DFS) management is a complicated process in radio access networks (RANs) operating in the 5 GHz bands. In an 802.11 wireless local area network (WLAN), the access point (AP) coordinating the network acts as a DFS owner and the process is considerably simplified. By contrast, in a network using an ad-hoc or independent B SS (IBSS) the non-AP stations (STAs) share the beaconing and other management responsibilities and there is no central controller. The DFS owner is by default the STA which initiates the IBSS network. Over a period of time this information is learned by the entire network. The STA detecting a radar signal broadcasts a measurement report. The DFS owner uses the measurement reports and channel maps received from one or more STAs to determine the next channel. If it finds an available channel it sends a Channel Switch Announcement (CSA) for the same. If the initiating STA does not get a CSA within the DFS recovery interval, it initiates a recovery procedure whereby it tries to do CSA on its own. Due to hidden node and other issues, this process is always best-effort and there is a possibility of the mesh falling apart.

We present a centrally managed approach to determine a Channel Switching sequence to be used in these scenarios. In general, a sequence of hops (subsequent channels) in used in FHSS techniques where the hopping sequence is burnt into the devices. FHSS based WLANs are in limited use due to interoperability issues. We use a software based approach to create a channel hopping sequence based on Measurement Reports at a central controller to be used in DFS situations.

We present a centrally managed approach to determine a Channel Switching sequence for DFS in a MSS network.

FHSS techniques are generally employed in narrowband communications, especially where increased security is desired. The base idea is employ a predefined hop-pattern so all devices can switch to the same set of frequencies in a lock-step manner. FHSS slowly lost relevance as: this hop pattern was non-configurable and vendor specific in general; frequency hopping is more suited to narrow band communication than wide-band communication, as when narrowband is used, the more channels are available for communication and the possibility of finding a free channel is higher; and the hop patterns used to have sequence of as many as 70 to 80 channels.

DFS is one area where channel switching in an efficient way is a requirement for legal operation. The standard mechanism suffers from limitations as detailed in the 802.11-2012 standard (Section 10.9.8.3, hereby incorporated by reference).

This disclosure aims at combining the efficient and deterministic switching of FHSS with the intelligence available at a central controller (SON controller), which could interpret and refine the measurement reports available from multiple RAN nodes to define a hop-pattern to be pushed down to the access-nodes. Based on some or all reports regarding channels, noise, etc. from some or all RANs, the central controller may tell a RAN which frequency to pick on a DFS event, rather than forcing the RAN to pick a frequency among n available frequencies. (A DFS event, also called a radar event, may be understood to mean a detection event of interfering radiation in the DFS band, in some usages found in this document.)

In some embodiments, based on information built up over time at the SON controller, the central controller may be able to identify which frequencies work better on particular days. As an example, we already know the set of frequencies which have the same regulatory profile. For example, the UNI-III band may be used in the US or the Band-C band may be used in the UK. We would try to remain in the same band so that the power setting is not impacted (Currently even the band could change). Then from this set of frequencies we would have the noise data, and historic information we could pick 1 over the other.

In some embodiments, one or more RANs are made aware of a DFS sequence, which is periodically updated. This mechanism can be used both in lieu of an in conjunction with the standard mechanism. DFS sequences may be coordinated over multiple RANs connected to a single gateway node, and all nodes in the mesh network may be coordinated to have the same DFS sequence. In some embodiments, different DFS sequences may be given to different RANs, such as RANs connected to a different gateway node.

As an example of DFS channel selection using band B and C in Europe (specifically UK using 20 MHz channels), Band B is between 5470-5725 MHz, with center frequencies 5500, 5520, 5540, 5560, 5580, 5600, 5620, 5640, 5680, 5700. Band C is between 5725-5850 MHz, with center frequencies 5745, 5765, 5785, 5825. Initially the starting frequency may be set to be 5745 and band C is preferred in configuration. The central controller may indicate a simple sequential hop pattern at the driver, using frequencies in the following order: 5745, 5765, 5785, 5825, 5500, 5520, 5540, 5560, 5580, 5600, 5620, 5640, 5680, 5700. Over a period of time the central controller may learn that 5785 and 5825 always have DFS events together, and also that, in Band B, 5560-5600 are extremely prone to DFS, so over a period of time the hop-pattern to be pushed down could become: 5745, 5765, 5785, 5500, 5520, 5540, 5620, 5640, 5680, 5700, 5560, 5580, 5600, 5825.

In some embodiments, the AP is the DFS owner. The AP would use information from Supported Channel elements and the measurement reports to decide the new channel to test. A DSS algorithm should comply with regulations such as the Uniform Spreading rule or channel test rules. The AP can use the switch using Channel Switch Announcement elements in Beacon frames, Probe Response Frames or a Channel Switch Announcement frames to inform the STAs of a channel switch.

The DFS owner makes a decision to switch to a new channel based on the Measurement Reports received regarding radar detection. The owner uses a Channel Switch Announcement elements in Beacon frames, Probe Response Frames or a Channel Switch Announcement frames to inform the STAs of a channel switch.

When used in conjunction with the standard algorithm, the DFS owner as well as the STA using the recovery procedure uses this sequence while determining the next channel for CSAs. Any node which misses the CSA knows what channel to switch to.

When used in lieu of the standard algorithm, it also allows for a faster switching time, by reducing the recovery time. A predetermined sequence of channel switches also allows for all STAs to just start with the recovery procedure (using an exponential backoff with jitter).

In some embodiments, the method described herein may be implemented at a central node or one or more cloud coordination nodes having the ability to control the DFS sequence of one or more base stations. The cloud coordination server may perform analytics to identify free and non-free channels, including using historical records and predictive methods. For example, the cloud coordination server may determine that some frequencies are problematic only on Sundays. As another example, the cloud coordination server may determine that all frequencies should have an equal chance of selection, or that certain frequencies should be handled independently, in some embodiments taking regulatory requirements into account, such as the FCC uniform spreading requirement.

Unlike methods for selecting a frequency when the band is being used by multiple technologies (Wi-Fi, Bluetooth, etc.) using a detection mechanism, in case of DFS detection mechanisms are standardized and mandatory. Thus, a need exists for a method for sharing the spectrum efficiently by using means like transmit power etc. In the case of DFS, there is basically a negligible amount of time in which the WLAN devices have to move to a different channel (sharing so far is there is no transmission by radar). The DFS mechanisms are easy to do for isolated access points; however, when the same needs to be done over a mesh it becomes a complicated exercise to move to a new channel while obeying the regulatory and performance constraints. DFS is extremely interesting as strict timing requirements are imposed on it by the FCC and other regulatory bodies.

Unlike the 802.11h standard, hereby incorporated by reference in its entirety, which splits apart the base station (SME) and management unit (MLME), the methods herein include centrally-defined DFS mechanisms. Regarding the MLME, 802.11h says: "An AP may use the supported channels list for associated STAs as an input into an algorithm used to select a new channel for the BSS."

By contrast, the method herein includes, in some embodiments, a centrally controlled DFS mechanism which uses a historical analytical database to define DFS hop patterns which allow for a better probability of picking a non-interfering channel which would also meet the performance requirements of the mesh in the best possible manner, yet at the same time satisfying the timing constraints. The algorithm has been pushed out from the AP to the central entity, and the AP need only use a dumb pattern from its perspective.

In some embodiments, Wi-Fi and non-Wi-Fi (e.g., UMTS, LTE, or other wireless protocols) could use the DFS methods described herein. In some embodiments, the method described herein could be used for wireless protocols at frequencies higher than 5 GHz, such as 6 GHz, centimeter- and millimeter-wave frequency bands. In some embodiments, the described channel switching sequence determination techniques, systems, and methods defined in this document could be used for non-IBSS technologies as well, such as Infrastructure BSS and/or non Wifi technologies (e.g. LTE-U) which could operate in a DFS band.

FIG. 1 depicts a network diagram of a wireless network, in accordance with some embodiments. Mobile devices 101 are attached to wireless access point 102. Mobile devices 103 are attached to wireless access point 104, which is a multi-radio access technology (multi-RAT) node capable of providing wireless access according to more than one radio access technology, e.g., 3G, 4G, LTE, and/or Wi-Fi. Mobile devices 105 are attached to wireless access point 106. Each of wireless access points 102, 106 and multi-RAT node 104 are enabled to connect to each other in a mesh topology using a Wi-Fi interface. As shown, only a poor-quality connection between access point 102 and gateway 107, and between access point 106 and gateway 107, is available, and a mesh link to multi-RAT node 104 is used by both APs 102 and 106 to gain access to gateway 107. The mesh interfaces may be 5 GHz Wi-Fi interfaces susceptible to DFS event interference. The Wi-Fi APs may use 5 GHz Wi-Fi for providing wireless access, which may also be susceptible to DFS event interference.

Coordinating gateway 107 handles mobile devices 101, 103, 105 connected to each of access points 102, 106 and multi-RAT node 104, either over a 3GPP Iu or S1 protocol, or over a 3GPP-interworked S2 or S2a protocol. Other protocols may be contemplated, such as a Voice-over-IP (VoIP) call or a non-multimedia IP packet session. Gateway 107 is connected to, and acts as a gateway to, the operator core network evolved packet core (EPC) 108, which includes packet data network gateway (PGW) 108a, serving gateway (SGW) 108b, and mobility management entity (MME) 108c. Any other core network, or the public Internet, or a private intranet, may be provided in place of EPC 108, in some embodiments.

Radar source 110 generates sporadic radar interference in the 5 GHz band, in some embodiments, affecting all the 5 GHz radio links in the network.

In operation, when a DFS event is generated by radar source 110, APs 102 and 106, and multi-RAT node 104, are forced to change frequencies according to a frequency hop sequence. APs 102 and 106, and multi-RAT node 104, send measurement reports for each DFS event to gateway 107, and gateway 107 configures the APs 102 and 106, and multi-RAT node 104, with identical frequency hop sequences, enabling the APs 102 and 106, and multi-RAT node 104, to stay on the same set of frequencies as each other.

Figure 2:
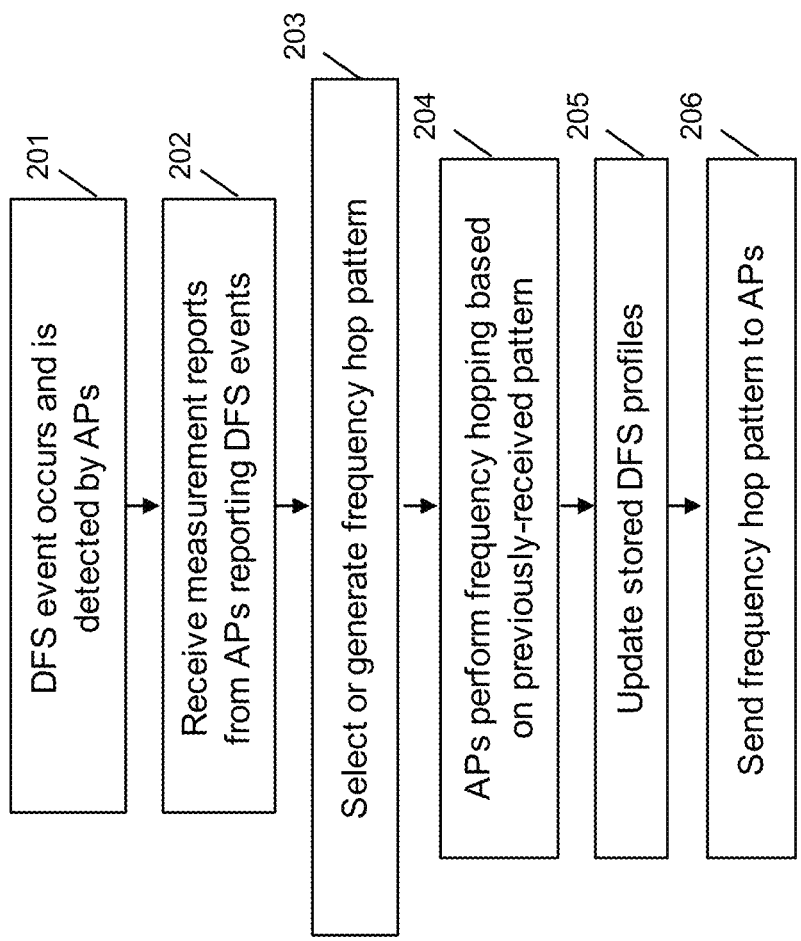
FIG. 2 is a flowchart of an exemplary method, in accordance with some embodiments.

FIG. 2 is a flowchart of an exemplary method, in accordance with some embodiments. At step 201, a DFS event occurs and is detected by one or more access points. At step 202, the APs send measurement reports to a coordinating gateway, which collects and collates responses and determines that it should record the DFS event. At step 203, the coordinating gateway may, in some embodiments, select a frequency hop pattern from a preconfigured list or database, or in other embodiments, may generate a frequency hop pattern. The frequency hop pattern is configured to enable the APs to avoid interference from the DFS event. The frequency hop pattern is based on the received measurement reports. However, as generating, retrieving and/or sending the new frequency hop pattern may take a certain amount of time, owing to network latency and computation time, in some embodiments an AP may use a previously-received pattern to hop to a frequency for avoiding the present DFS event, at step 204. At step 205, the coordinating gateway may update stored DFS profiles. For example, if a new hop pattern has been generated, the new hop pattern may be saved. As another example, the time, date, and day of the DFS event may be recorded and a profile based on all past recorded DFS events could be created, for use in generating a new frequency hop pattern. At step 206, the frequency hop pattern is sent to all APs managed by the coordinating gateway.

Certain hardware that may be used in some embodiments of the disclosure are now described.

Figure 3:
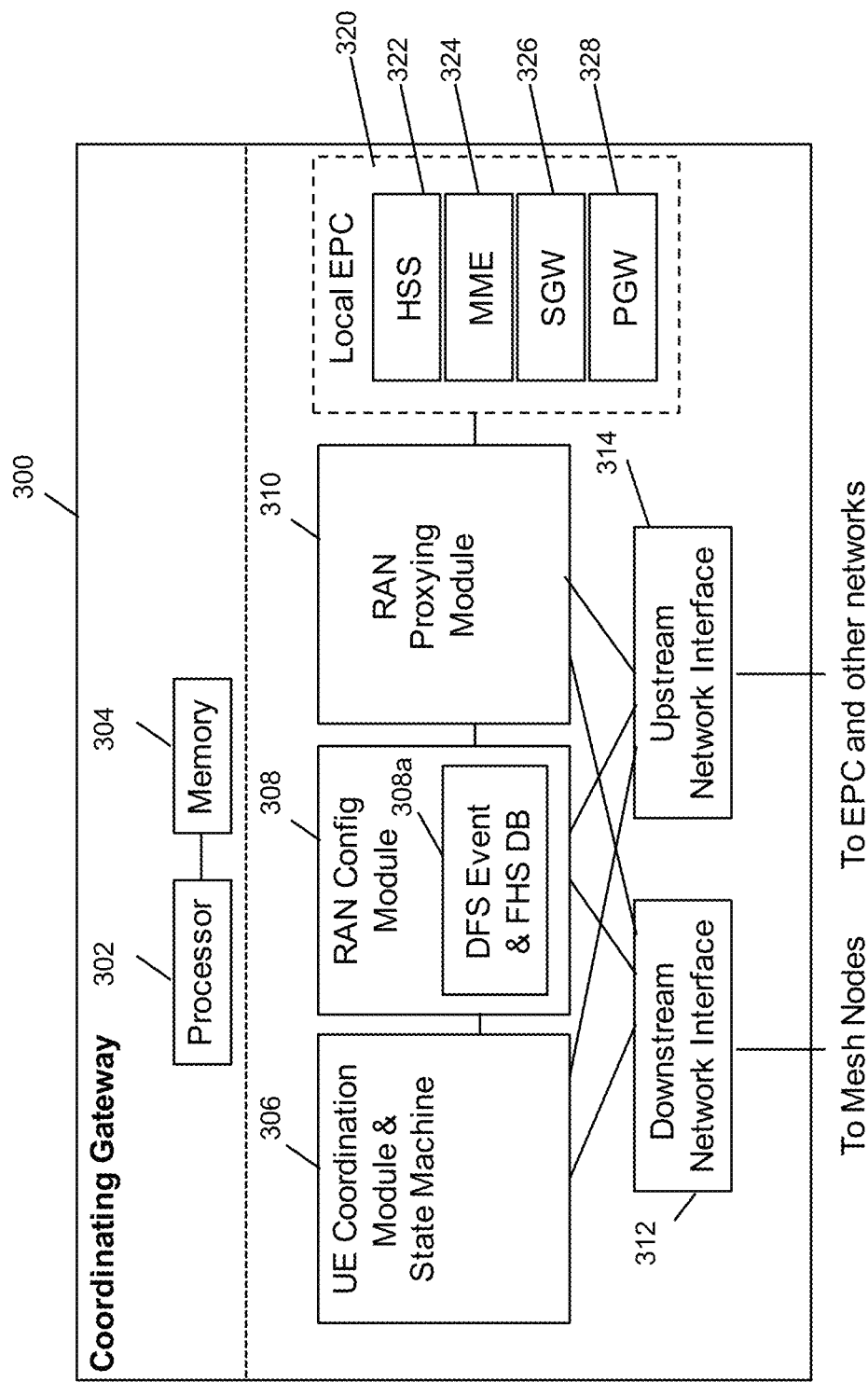
FIG. 3 is a schematic diagram of a coordinating gateway, in accordance with some embodiments.

FIG. 3 is a schematic diagram of a coordination node, in accordance with some embodiments. Coordination node/gateway 300 includes processor 302 and memory 304, which are configured to provide the functions described herein. Also present are UE coordination module and state machine 306, which may include IMSI filter and whitelist 306a, radio access network (RAN) configuration module 308, and radio access network proxying module 310. UE module 306 may use a state machine to determine how to virtualize messages to or from the UE at the coordinating node. UE module 306 may provide services for enabling Wi-Fi UEs to connect to an operator core network. In some embodiments, gateway 300 may coordinate multiple RANs using coordination module 308. If multiple RANs are coordinated, a database may include information from UEs on each of the multiple RANs. RAN configuration module 308 may include a DFS event and frequency hop sequence (FHS) database (DB) 308a, and may provide generation, retrieval, and profiling of DFS events as described herein.

In some embodiments, gateway 300 may also provide proxying, routing virtualization and RAN virtualization, including X2, S1, and S2a proxying, via module 310. In some embodiments, a downstream network interface 312 is provided for interfacing with the RANs, which may be a radio interface (e.g., LTE), and an upstream network interface 314 is provided for interfacing with the core network, which may be either a radio interface (e.g., LTE) or a wired interface (e.g., Ethernet). Signaling storm reduction functions may be performed in module 306. In some embodiments, gateway 300 may also provide TWAG or ePDG services, using trusted wireless gateway module 310 and, in some instances, local EPC 320 and HSS 322.

In some embodiments, gateway 300 includes local evolved packet core (EPC) module 320, for authenticating users, storing and caching priority profile information, and performing other EPC-dependent functions when no backhaul link is available. Local EPC 320 may include local HSS 322, local MME 324, local SGW 326, and local PGW 328, as well as other modules. Local EPC 320 may incorporate these modules as software modules, processes, or containers. Local EPC 320 may alternatively incorporate these modules as a small number of monolithic software processes. Modules 306, 308, 310 and local EPC 320 may each run on processor 302 or on another processor, or may be located within another device.

Figure 4:
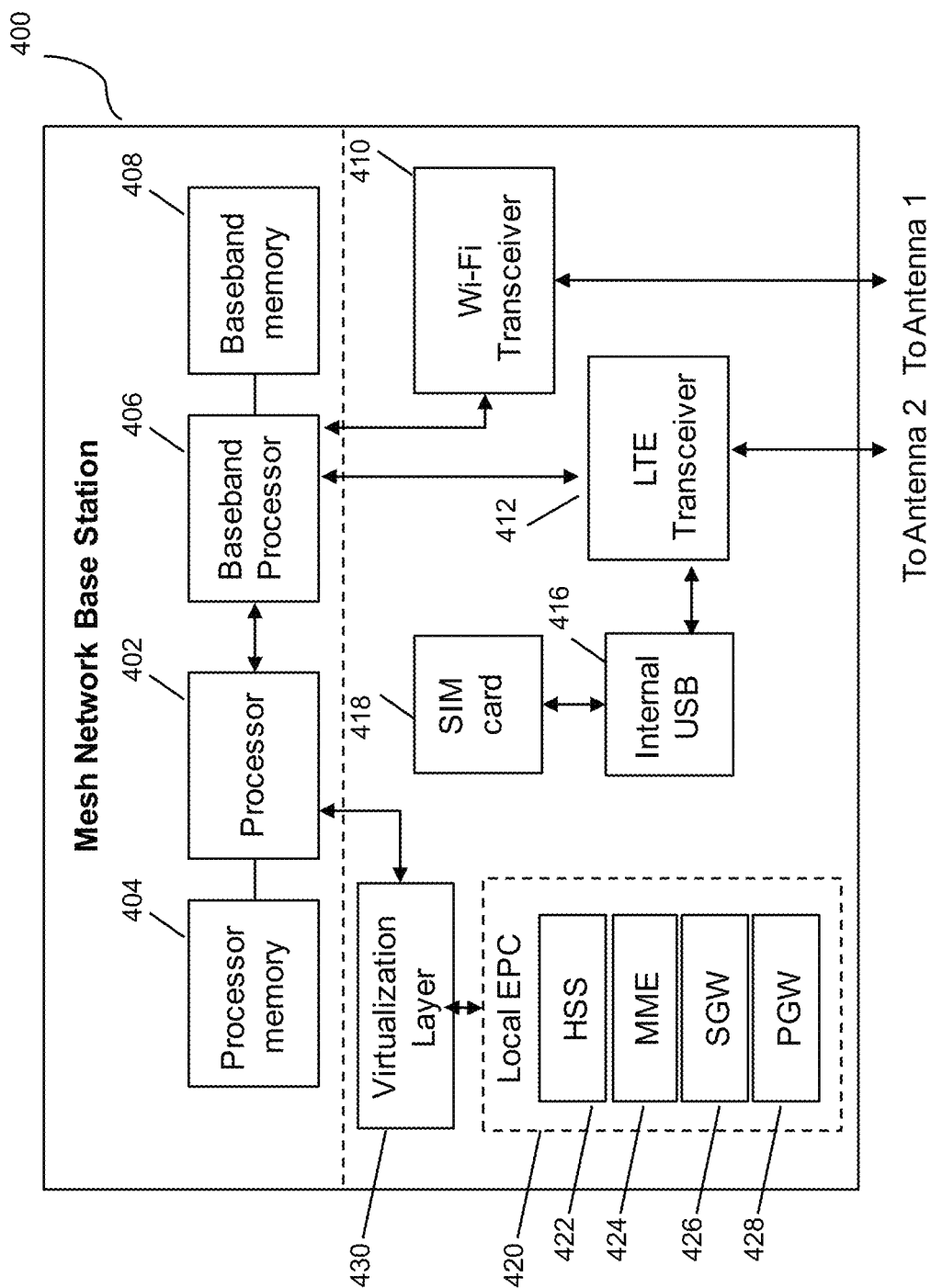
FIG. 4 is a schematic diagram of an enhanced base station, in accordance with some embodiments.

FIG. 4 is a schematic diagram of an enhanced base station, in accordance with some embodiments. Enhanced eNodeB 400 may include processor 402, processor memory 404 in communication with the processor, baseband processor 406, and baseband processor memory 408 in communication with the baseband processor. Enhanced eNodeB 400 may also include first radio transceiver 410, which may be a Wi-Fi transceiver, and second radio transceiver 412, which may be an LTE transceiver utilizing an LTE modem module connected to internal universal serial bus (USB) port 416 with subscriber information module card (SIM card) 418 coupled to USB port 414. In some embodiments, the second radio transceiver 414 itself may be coupled to USB port 416, and communications from the baseband processor may be passed through USB port 416.

Processor 402 and baseband processor 406 are in communication with one another. Processor 402 may perform routing functions, and may determine if/when a switch in network configuration is needed. Processor 402 may interpret FHS messages received from a coordinating node, and utilize these messages to perform frequency hopping, as described herein. Processor 402 may be responsible for initiating channel switch announcements (CSAs) and other Wi-Fi protocol messages as described herein, in conjunction with baseband processor 406. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

SIM card 418 may provide information required for authenticating the simulated UE to the evolved packet core (EPC). When no access to an operator EPC is available, a local EPC on the enhanced eNodeB itself (not shown) may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 410 and 412, which may be Wi-Fi 802.11a/b/g/n/ac/ad/ah, Bluetooth, ZigBee, microwave (including line-of-sight microwave), satellite, or another wireless backhaul connection. Any of the wired and wireless connections may be used for either access or backhaul, according to identified network conditions and needs, and may be under the control of processor 402 for reconfiguration.

Other elements and/or modules may also be included, such as a home eNodeB, a local gateway (LGW), or another module. Additional radio amplifiers, radio transceivers and/or wired network connections may also be included.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 412 and 414. Baseband processor 406 may also perform operations to decode signals received by transceivers 412 and 414. Baseband processor 406 may use memory 408 to perform these tasks.

In some embodiments, the access points described herein may be compatible with a Long Term Evolution (LTE) radio transmission protocol or air interface (i.e., they may have base station capability). The LTE-compatible base stations may be eNodeBs. In addition to supporting the LTE protocol, the access points may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the access points described herein may support Wi-Fi air interfaces, which may include one of 802.11a/b/g/n/ac/ad/af/ah. In some embodiments, the access points described herein may support 802.16 (WiMAX), or other air interfaces. In some embodiments, the access points described herein may provide access to land mobile radio (LMR)-associated radio frequency bands. In some embodiments, the access points described herein may also support more than one of the above radio frequency protocols, and may also support transmit power adjustments for some or all of the radio frequency protocols supported.

Additional enhancements and embodiments follow.

1. Off-Channel Radar Scanning

In some embodiments, off-channel DFS radar scanning may be incorporated, such as described in the European Telecommunications Standards Institute (ETSI) standard version 1.5.1. Off-channel DFS radar scanning to help alleviate the 10 minute CAC (channel availability check) time for TDWR (Terminal doppler weather radar). Preferred frequency enforcement can be used to prevent the Atheros driver from choosing channels that require the extended CAC time.

2. Preferred Frequency Enforcement

In some embodiments, the controller node is used to configure a set of preferred frequencies for use in a backhaul network on a Wi-Fi radio. When starting a backhaul network, the possible frequencies are restricted to this set of preferred frequencies. When a DFS radar detection event occurs, the controller node may prevent the radio from jumping to a new frequency outside of this range.

In some embodiments, the wireless network access card may have a driver with a "flags" element in the data structure for each frequency. An "allowed" attribute can be added that may be used to specify whether or not the frequency is part of the preferred set of frequencies. A new IOCTL may serve as the API for configuring frequencies as allowed or not. By default, all frequencies may be disallowed. Before starting a network, a Wi-Fi management module may need to push the set of preferred frequencies down to the driver. The driver may always check to be sure that a particular frequency is allowed before enabling a radio on the frequency. Additionally, whenever the driver decides to jump to a new frequency (e.g., for a DFS event), it may check the "allowed" attribute of a frequency before choosing it.

An additional benefit of maintaining such a preferred frequency mask for each radio is that Auto Channel Selection (ACS) can now be enabled. Once the preferred frequency mask is set, the ACS procedure can be modified to only consider frequencies within the mask.

3. DFS Events and Alarms

In some embodiments, DFS radar detection events are not merely handled at the driver level and/or silently logged to a kernel log, e.g., /var/log/messages, requiring the user to scan the log files to determine if such an event occurred, but instead may involve sending an indication to a Wi-Fi management module or a cloud coordination server The wireless card driver may be enhanced to include support for asynchronous "netlink" messages for relaying information up to a user-level application. When DFS-related events occur, a netlink message may be created and sent to the Wi-Fi management module. The Wi-Fi management module may be listening for the messages from the driver. Each received message may be formatted into a proper event, alarm, or informational messages and forwarded on to a fault manager so that it can be logged locally, and then sent to a cloud coordination server.

4. Duplicate Frequency Avoidance

When DFS events occur, it is possible that more than one radio ends up on the same channel due to radar event avoidance. If both radios in a communicative pair go to the same channel, this automatically causes the network to lose half its throughput as it gets reduced to a half-duplex mode. In some embodiments, a mechanism may ensure that the radios remain on different channels after DFS, preventing multiple base stations from using the same (duplicate) frequency after a DFS-triggered frequency jump.

A global table may be added to the driver to track the currently in-use frequencies by all radios on the CWS. Each time a DFS event triggers a frequency change, the global table may be consulted to be sure that frequencies are not reused by multiple radios. In the event that there are no available frequencies, except for a duplicate frequency, the duplicate frequency may be allowed, but an alarm may be generated to indicate that multiple radios are using the same frequency.

5. Preferred Frequency Learning

When a new node joins the mesh, it is unaware of any "preferred" frequencies. This could be problematic if this new node becomes the DFS owner. When a node is the DFS owner, it is responsible for choosing the next frequency to jump to in the event of a radar detection. This means that it may choose a frequency that is outside of the set of preferred frequencies.

Each Wi-Fi node may advertise its allowable frequencies as an information element (IE) in the beacons it transmits. Any node that is already part of the mesh may need to advertise only its preferred frequencies in its beacon IEs. This may allow any new nodes that are joining the mesh to learn the preferred frequencies from the existing nodes and program its own set of preferred frequencies accordingly. In some embodiments, the cloud coordination server, or individual nodes, may cache these frequencies.

6. Lower Transmit Power on DFS

Typically, upon a DFS event occurring, the driver tries to remain in the same band. However, when there is a DFS event detected on one channel in band C, sometimes in some scenarios the event is detected on all the channels in the band; causing a switch to band A, which may be an indoor band. In some embodiments, instead of the driver ignoring outdoor/indoor configuration in DFS channel reselection procedure, this information may be taken into account. Also, in the case that we are running the radio with too much power in the new band, i.e., when combined with the antenna the regulatory max. EIRP is being violated, the power may be reduced. The driver may stays within the list of channels configured from the coordination node.

In some embodiments, this preference is available at one or more mesh nodes, or at the gateway, or at another node in the network. An arbitrary number of channels may be supported. In some embodiments, antenna compensation/power adjustment may be performed on a band switch. In other embodiments, the compensation is done only at configuration time only. In some embodiments, transmit power level validations may be checked, as it is possible that stock configuration would restrict radio power to allow the max-power for the antenna and frequency combination with the lowest EIRP.

7. Antenna Gain in detection

Antenna gain may be detected, incorporated, and sent to the driver, in some embodiments. As per the specs if DFS event detection threshold is set to −69 dBm, that assumes a 0 gain receiver. In the example of antennas with a gain of 15 dBi typically, the applicable threshold should be −54 dBm. The configuration may take into account the fact that radars generally have extremely high transmit power. A 15 dB change in Rx sensitivity amounts to approximately 5 times increase in the range where the transmission would impact the radar.

The foregoing discussion discloses and describes merely exemplary embodiments of the present disclosure. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present disclosure may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Features of one embodiment may be combined with features of another embodiment. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention.

The invention claimed is:

1. A method for performing dynamic frequency selection (DFS), comprising:
   sending, to a gateway, measurement reports from a radio access node regarding observed utilization of a radio frequency band shared with a plurality of radio access nodes, the gateway determining, based on measurement reports sent by the radio access node, a frequency hop pattern at the gateway;
   receiving the frequency hop pattern from the gateway at each of the plurality of radio access nodes, thereby enabling compliance with DFS regulations using a centralized gateway; and
   selecting a backhaul radio frequency based on the frequency hop pattern and using a global table to avoid multiple radios being switched to the same frequency.

2. The method of claim 1, wherein the plurality of radio access nodes is at least two access points each using 802.11 Wi-Fi in a 5GHz frequency band or a 2.4 GHz frequency band.

3. The method of claim 1, wherein the plurality of radio access nodes is connected in a 5 GHz Wi-Fi mesh network and is configured to use the gateway to connect to a telecommunications operator core network.

4. The method of claim 1, wherein the frequency hop pattern is a channel switching sequence.

5. The method of claim 1, further comprising retrieving the frequency hop pattern from a database at the gateway.

6. The method of claim 1, wherein the radio access node is one of a 3G, 4G, LTE or Wi-Fi radio access node.

7. The method of claim 1, further comprising switching, at the plurality of radio access nodes, to a next frequency specified by the frequency hop pattern to avoid, or avoid causing, interference to communications radars, weather radars, or military communications.

8. The method of claim 1, wherein an individual radio access node causes connected devices to move to the next frequency using a channel switch announcement in a beacon frame or channel switch announcement frame.

9. The method of claim 1, further comprising sending, from an individual radio access node, the frequency hop pattern to a plurality of connected stations to enable the plurality of connected stations to perform a back off recovery procedure.

10. The method of claim 1, further comprising detecting, at one of the plurality of radio access nodes, a radar or military signal in a 5 GHz radio frequency band.

11. The method of claim 1, further comprising configuring a selection method at the gateway from a remote management client or periodically updating the selection method at the gateway.

12. The method of claim 1, further comprising propagating the frequency hop pattern to each node in a mesh network.

13. The method of claim 1, further comprising providing a second frequency hop pattern to an additional radio access network.

14. The method of claim 1, further comprising selecting the frequency hop pattern based on received signal strength information (RSSI) or signal to noise ratio (SNR).

15. The method of claim 1, further comprising selecting the frequency hop pattern based on historical DFS event data, regulatory profile data, or indoor/outdoor frequency band configuration.

16. The method of claim 1, wherein the frequency hop pattern is a single frequency to pick at a next DFS event.

17. The method of claim 1, further comprising performing off-channel radar scanning.

18. The method of claim 1, further comprising advertising preferred frequencies at each radio access node in a mesh network, and caching the preferred frequencies at the gateway.

19. A system for performing dynamic frequency selection (DFS), comprising:
   a radio access node configured to perform steps comprising:
   sending, to a gateway, measurement reports regarding observed utilization of a 5 GHz radio frequency band or a 2.4 GHZ frequency band shared with a plurality of radio access nodes, the gateway determining, based on measurement reports sent by the radio access node, a frequency hop pattern at the gateway;
   selecting a backhaul radio frequency based on the frequency hop pattern and using a global table to avoid multiple radios being switched to the same frequency; and
   receiving the frequency hop pattern from the gateway to at each of the plurality of radio access nodes, thereby enabling compliance with DFS regulations using a centralized gateway.

* * * * *